United States Patent
Zhao et al.

(10) Patent No.: US 11,520,149 B2
(45) Date of Patent: Dec. 6, 2022

(54) VARIFOCAL DISPLAY WITH WAVELENGTH TUNING

(71) Applicant: META PLATFORMS TECHNOLOGIES, LLC, Menlo Park, CA (US)

(72) Inventors: Yang Zhao, Kirkland, WA (US); Douglas Robert Lanman, Bellevue, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 180 days.

(21) Appl. No.: 17/006,584

(22) Filed: Aug. 28, 2020

(65) Prior Publication Data
US 2022/0066213 A1    Mar. 3, 2022

(51) Int. Cl.
*G02B 27/01* (2006.01)
*H04N 9/31* (2006.01)

(52) U.S. Cl.
CPC ....... *G02B 27/0172* (2013.01); *H04N 9/3111* (2013.01); *G02B 2027/0112* (2013.01); *G02B 2027/0178* (2013.01)

(58) Field of Classification Search
CPC ........ G02B 27/0172; G02B 2027/0112; G02B 2027/0178; H04N 9/3111
See application file for complete search history.

(56) References Cited

U.S. PATENT DOCUMENTS

| | | | | |
|---|---|---|---|---|
| 9,980,343 | B1* | 5/2018 | Sussman | H05B 45/20 |
| 10,056,018 | B1* | 8/2018 | Laski | F21S 10/066 |
| 2007/0127125 | A1* | 6/2007 | Sasaki | G02B 5/1876 |
| | | | | 359/569 |
| 2009/0227847 | A1* | 9/2009 | Tepper | A61B 90/30 |
| | | | | 600/249 |
| 2013/0182321 | A1* | 7/2013 | Silverstein | H04N 13/334 |
| | | | | 359/464 |
| 2021/0258662 | A1* | 8/2021 | Robertson | H04Q 11/0005 |

* cited by examiner

*Primary Examiner* — Kwang-Su Yang
(74) *Attorney, Agent, or Firm* — Morgan, Lewis & Bockius LLP

(57) ABSTRACT

A display device includes a diffractive optical element and a tunable light source operable in different states including a first state and a second state. The tunable light source provides first light having a first wavelength while the tunable light source is in the first state and second light having a second wavelength, distinct from the first wavelength, while the tunable light source is in the second state. The first wavelength and the second wavelength correspond to a first color band. The diffractive optical element is positioned to receive and redirect the first light and receive and redirect the second light. The diffractive optical element has a first focal length for the first light and a second focal length, distinct from the first focal length, for the second light.

18 Claims, 10 Drawing Sheets

VARIFOCAL DISPLAY WITH WAVELENGTH TUNING

TECHNICAL FIELD

This relates generally to head-mounted display devices, and in particular to head-mounted display devices with varifocal displays.

BACKGROUND

Head-mounted display devices (also called herein head-mounted displays) are gaining popularity as means for providing visual information to a user. For example, the head-mounted display devices are used for virtual reality, augmented reality, and mixed reality operations. However, the size and weight of head-mounted display devices often limit applications of head-mounted displays.

In addition, vergence-accommodation conflict can impact the user experience with head-mounted displays. Varifocal displays are capable of causing changes to accommodation by a viewer's eye, thereby reducing or eliminating vergence-accommodation conflict. However, conventional varifocal displays increase the size and weight of head-mounted displays.

SUMMARY

Accordingly, there is a need for varifocal displays that are compact-sized and light-weighted. In turn, such varifocal displays can enable compact and light-weighted head-mounted displays.

The above deficiencies and other problems associated with conventional head-mounted displays are reduced or eliminated by the disclosed varifocal display device with a tunable light source and a diffractive optical element.

In accordance with some embodiments, a display device includes a diffractive optical element and a tunable light source operable in different states including a first state and a second state. The tunable light source provides first light having a first wavelength while the tunable light source is in the first state and second light having a second wavelength distinct from the first wavelength while the tunable light source is in the second state. The first wavelength and the second wavelength correspond to a first color band. The diffractive optical element is positioned to receive and redirect the first light, and has a first focal length for the first light. The diffractive optical element is also positioned to receive redirect the second light, and has a second focal length, distinct from the first focal length, for the second light.

In accordance with some embodiments, a method is performed at a tunable light source operable in different states including a first state and a second state. The method includes placing the tunable light source in the first state for providing first light having a first wavelength and placing the tunable light source in the second state for providing second light having a second wavelength distinct from the first wavelength. The first wavelength and the second wavelength correspond to a first color band. The method also includes receiving and redirecting the first light and receiving and redirecting the second light with the diffractive optical element. The diffractive optical element has a first focal length for the first light and a second focal length, distinct from the first focal length, for the second light.

In accordance with some embodiments, a set of one or more controllers configured for use with the display device described herein includes one or more processors and memory storing one or more programs for execution by the one or more processors. The one or more programs include instructions for placing the tunable light source in the first state for providing the first light having the first wavelength and placing the tunable light source in the second state for providing the second light having the second wavelength distinct. The one or more programs also include instructions for adjusting an output power of the tunable light source so that a perceived intensity of the second light by a user of the display device is substantially the same as a perceived intensity of the first light by the user.

In accordance with some embodiments, a set of one or more controllers configured for use with the display device described herein includes one or more processors and memory storing one or more programs for execution by the one or more processors. The one or more programs include instructions for placing the tunable light source in the first state for concurrently providing the first light having the first wavelength and the third light having the third wavelength. The one or more programs include instructions also for placing the tunable light source in the second state for concurrently providing the second light having the second wavelength and the fourth light having the fourth wavelength.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Figure 1:
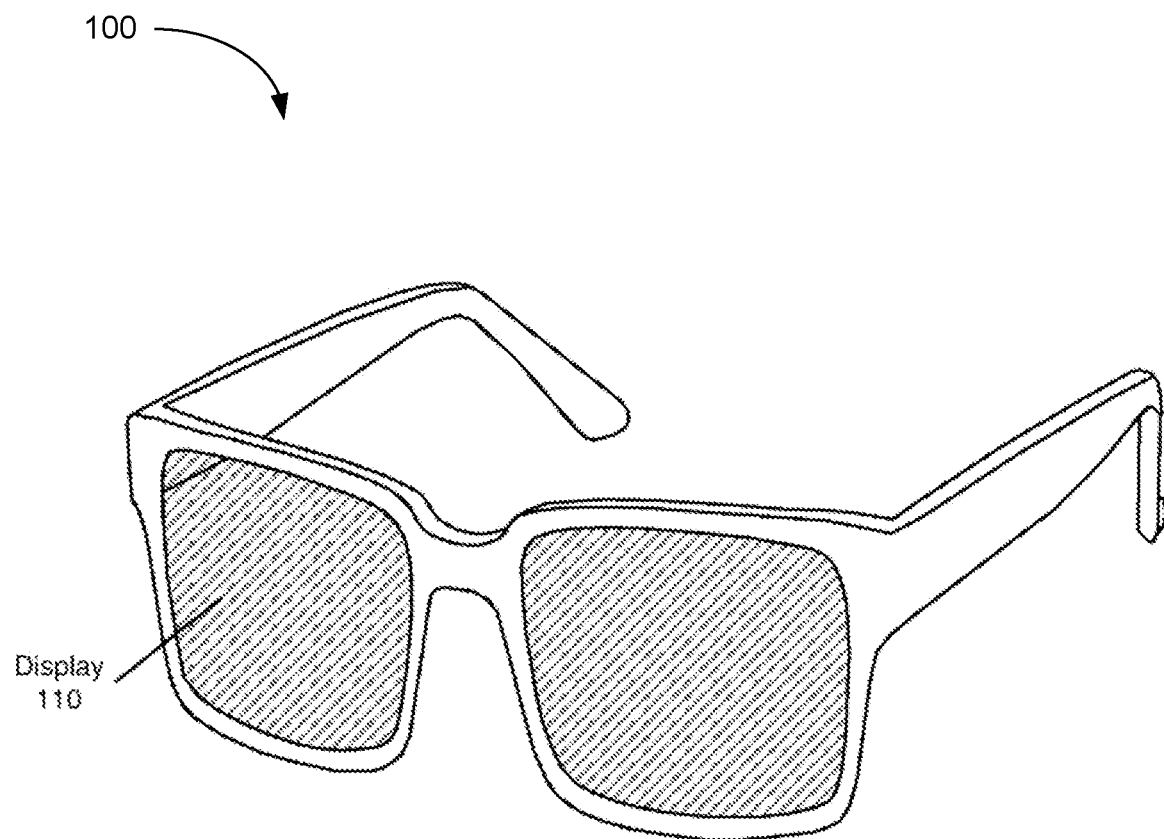
FIG. 1 is a perspective view of a display device in accordance with some embodiments.

These figures are not drawn to scale unless indicated otherwise.

DETAILED DESCRIPTION

Virtual reality (VR), augmented reality (AR), and mixed reality (MR) display devices simulate virtual reality environments by displaying computer-generated stereoscopic images to create a perception of depth. Such stereoscopic images may be displayed on an electronic display inside a head-mounted display, and provide the perception of depth (or distance) for a viewer.

However, the conflict between vergence and accommodation, both of which are associated with viewing of a stereoscopic image, can impact user experience with head-mounted displays. Although varifocal displays are capable of causing changes to accommodation by a viewer's eye (e.g., by changing a location of a virtual image), thereby reducing or eliminating vergence-accommodation conflict, conventional varifocal displays increase the size and weight of head-mounted displays.

As described herein, a combination of a wavelength-dependent optics (e.g., a diffractive optical element) and a tunable light source can enable a light-weight and compact-sized varifocal display. The focal length of such wavelength-dependent optics changes as a function of a wavelength (e.g., due to diffraction and/or dispersion) so that light having different wavelengths are directed differently (e.g., focused to different planes). Such varifocal displays can be used in head-mounted displays, which, in turn, reduce the size and weight of head-mounted displays.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first diffractive optical element could be termed a diffractive optical element, and, similarly, a diffractive optical element could be termed a diffractive optical element, without departing from the scope of the various described embodiments. The first diffractive optical element and the second diffractive optical element are both diffractive optical elements, but they are not the same diffractive optical element.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed reality contents, or any combination thereof) to a user.

Figure 2:
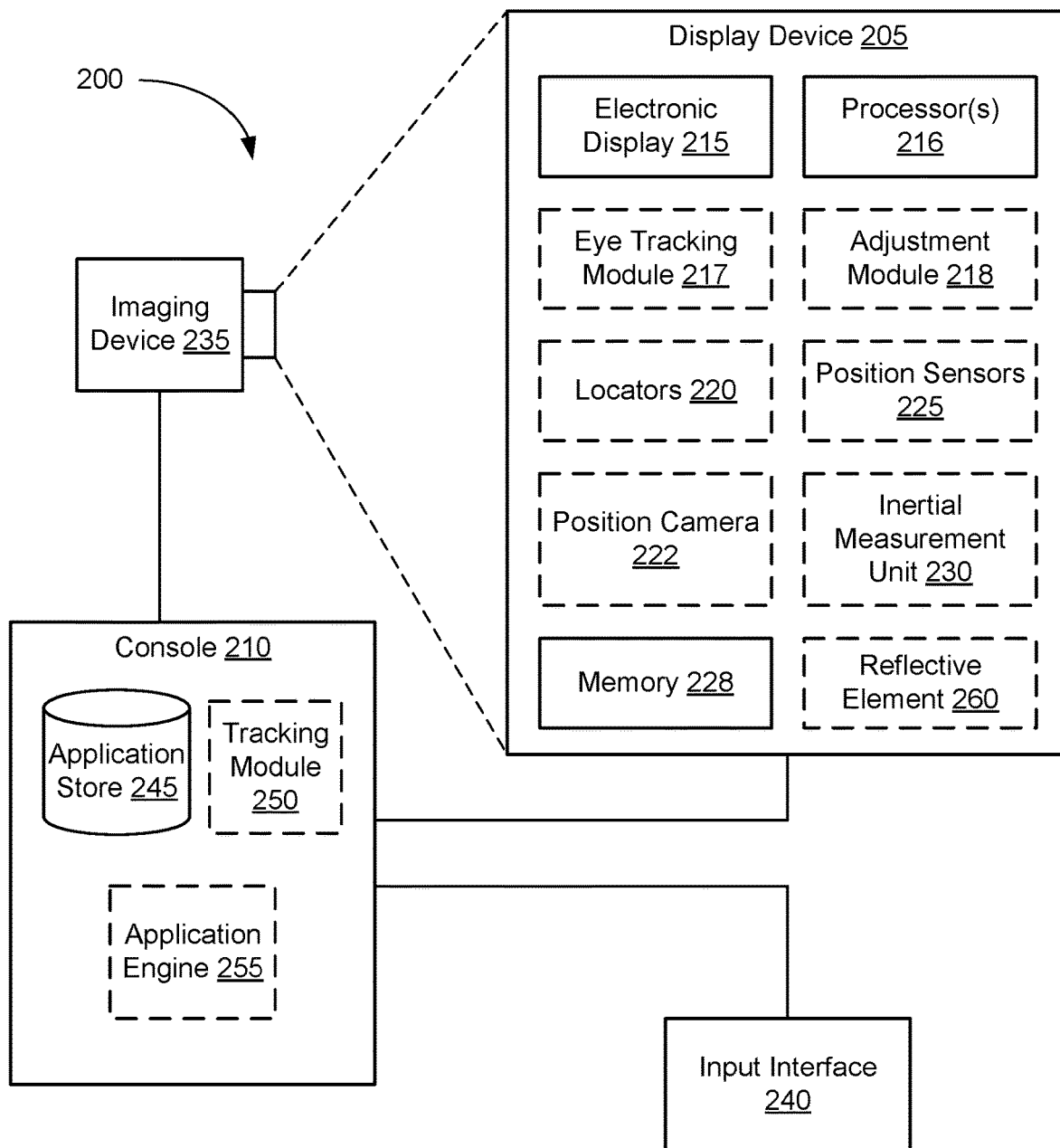
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver augmented reality, virtual reality, and mixed reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more reflective elements 260 or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to display images to the user by projecting the images onto one or more reflective elements 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array. In some embodiments, electronic display 215 projects images to one or more reflective elements 260, which reflect at least a portion of the light toward an eye of a user.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed. As used herein, IR refers to light with wavelengths ranging from 700 nm to 1 mm including near infrared (NIR) ranging from 750 nm to 1500 nm.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described herein.

Adjustment module 218 generates an image frame based on the determined locations of the pupils. In some embodiments, this sends a discrete image to the display that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 500 nm to 750 nm), in the infrared band (e.g., about 750 nm to 1 mm), in the ultraviolet band (about 100 nm to 500 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 optionally includes one or more reflective elements 260. In some embodiments, electronic display device 205 optionally includes a single reflective element 260 or multiple reflective elements 260 (e.g., a reflective element 260 for each eye of a user). In some embodiments, electronic display 215 projects computer-generated images on one or more reflective elements 260, which, in turn, reflect the images toward an eye or eyes of a user. The computer-generated images include still images, animated images, and/or a combination thereof. The computer-generated images include objects that appear to be two-dimensional and/or three-dimensional objects. In some embodiments, one or more reflective elements 260 are partially transparent (e.g., the one or more reflective elements 260 have a transmittance of at least 15%, 20%, 25%, 30%, 35%, 50%, 55%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 3:
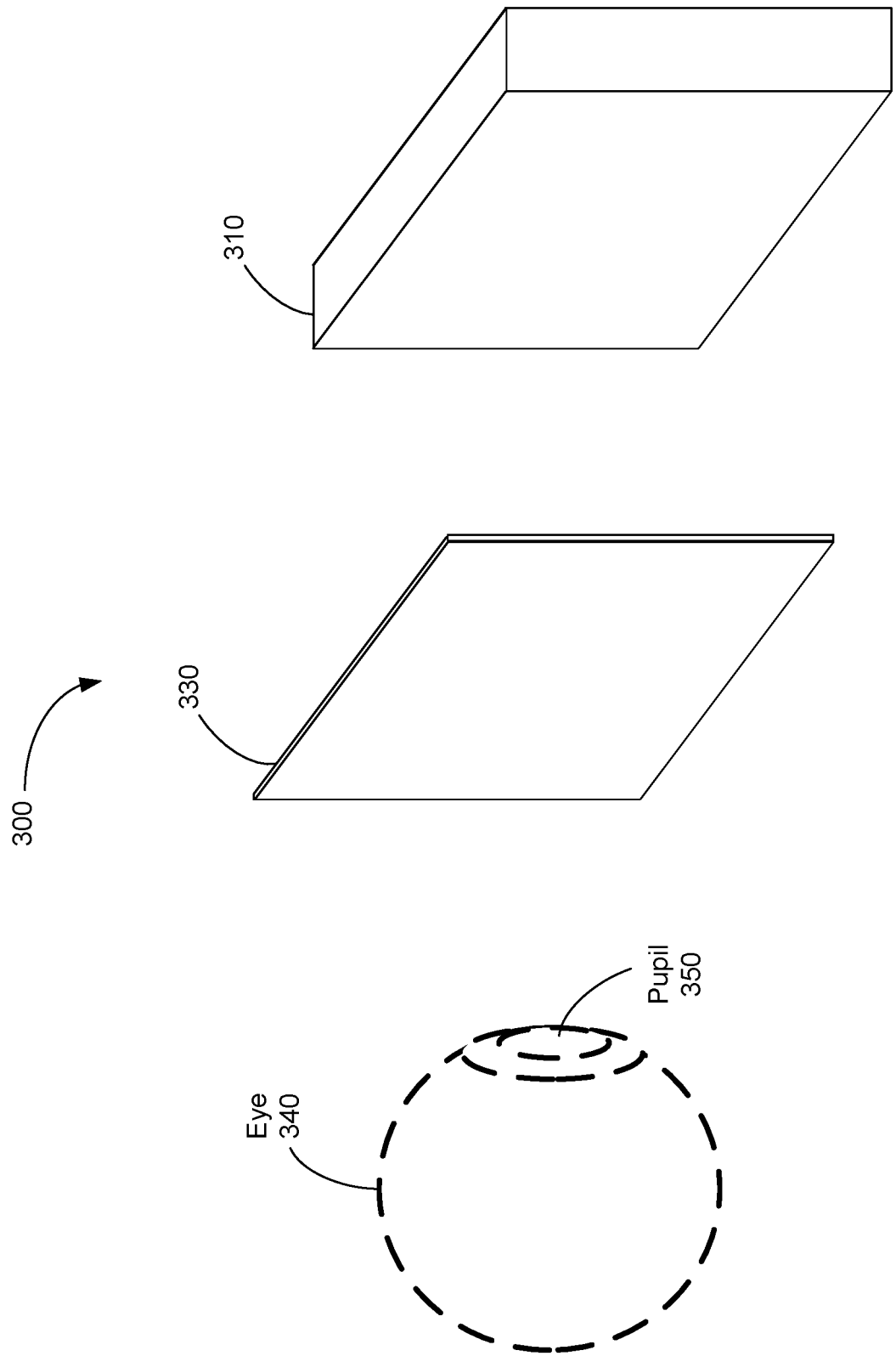
FIG. 3 is an isometric view of a display device in accordance with some embodiments.

FIG. 3 is an isometric view of display device 300 in accordance with some embodiments. In some other embodiments, display device 300 is part of some other electronic display (e.g., a digital microscope, a head-mounted display device, etc.). In some embodiments, display device 300 includes light emission device 310 (e.g., a light emission device array) and an optical assembly 330, which may include one or more lenses and/or other optical components. In some embodiments, display device 300 also includes an IR detector array.

Light emission device 310 emits image light and optional IR light toward the viewing user. Light emission device 310 includes one or more light emission components that emit light in the visible light (and optionally includes components that emit light in the IR). Light emission device 310 may include, e.g., an array of LEDs, an array of microLEDs, an array of OLEDs, or some combination thereof.

In some embodiments, light emission device 310 includes an emission intensity array (e.g., a spatial light modulator) configured to selectively attenuate light emitted from light emission device 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to provide image light and/or control what portion of the image light is passed to the optical assembly 330. In some embodiments, display device 300 uses the emission intensity array to facilitate providing image light to a location of pupil 350 of eye 340 of a user, and minimize the amount of image light provided to other areas in the eyebox.

The optical assembly 330 includes one or more lenses. The one or more lenses in optical assembly 330 receive modified image light (e.g., attenuated light) from light emission device 310, and direct the modified image light to a location of pupil 350. The optical assembly 330 may include additional optical components, such as color filters, mirrors, etc.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device 310 including an emission intensity array make up a display element. Alternatively, the display element includes light emission device 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more lenses toward the determined location of pupil 350, and not toward other locations in the eyebox.

Figure 4:
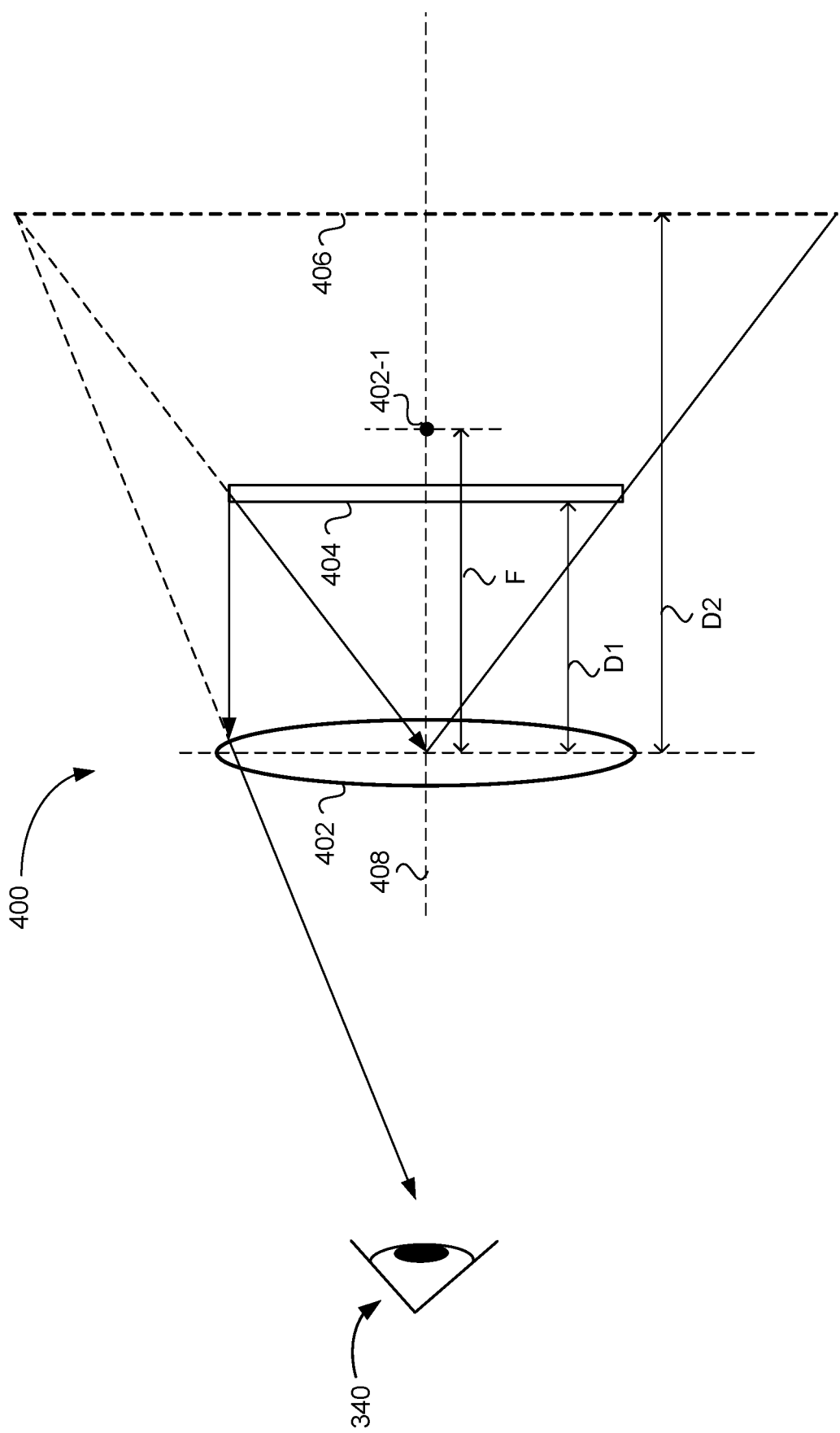
FIG. 4 is a schematic diagram illustrating a varifocal display device in accordance with some embodiments.

FIG. 4 is a schematic diagram illustrating display device 400 in accordance with some embodiments. In some embodiments, display device 400 corresponds to display device 300 described above with respect to FIG. 3 (e.g., viewing optics 402 may correspond to optical assembly 330 or a component thereof). Display device 400 is operable as a varifocal display device. As used herein, a varifocal display device refers to a display device that provides viewing images at varying distances (e.g., a user sees objects that appear to be positioned near and far) from a viewer. Display device 400 includes display 404 (e.g., a spatial light modulator) and viewing optics 402 optically coupled with display 404. In some embodiments, display 404 and viewing optics 402 are positioned to have a common optical axis (e.g., optical axis 408). As used herein, viewing optics refers to a set of one or more optical components that redirect light from a display toward an eye of a user of the display. In some embodiments, viewing optics 402 includes one or more varifocal diffractive elements or one or more lenses. Display 404 is configured to provide image light rendering one or more objects. Viewing optics 402 is configured to receive the image light from display 404 and redirect the image light toward an eye of a user (e.g., eye 340). In some embodiments, viewing optics 402 is configured to have a range of focal lengths dependent on a wavelength of the image light.

As shown in FIG. 4, display 404 and viewing optics 402 are separated by distance D1. In some embodiments, distance D1 between display 404 and viewing optics 402 is constant. For example, display 404 and viewing optics 402 may be mechanically coupled to a frame of display device 400 so that distance D1 remains constant even when display device 400 is operating as a varifocal display device. Instead of changing the relative positions of display 404 and viewing optics 402, the varifocal effect is obtained by changing an optical power of viewing optics 402. As shown, viewing optics 402 has a focal length F corresponding to a distance from viewing optics 402 to focal point 402-1. When focal length F is greater than distance D1, as shown in FIG. 4, a user of display device 400 looking at the image light projected by display 404 through viewing optics 402 gets an appearance that an object rendered by the image light is projected from virtual display plane 406 (e.g., a virtual image plane). In some embodiments, virtual display plane 406 is parallel to display 404. In some cases, a virtual display plane refers to a plane having a collection of focus points formed by extensions of diverging rays. In some cases, a virtual display plane is determined by tracing real rays emerging from viewing optics backward to the perceived or apparent origins of ray divergences. Virtual display plane 406 is positioned at distance D2 from viewing optics 402. Distance D2 is greater than distance D1. When display 404 is located closer to viewing optics 402 than focal length F of viewing optics 402, the relationship between distances D1, D2, and F is described by Equation 1:

$$\frac{1}{D2} - \frac{1}{D1} = -\frac{1}{F}.$$ (Equation 1)

In accordance with Equation 1, by changing focal length F (and a corresponding optical power), a user will perceive objects at different distances even when distance D1 remains constant. For example, increasing focal length F of viewing optics 402 causes virtual display plane 406 to appear closer to the viewer (e.g., distance D2 decreases) and decreasing focal length F of viewing optics 402 causes virtual display plane 406 to appears further away from the viewer (e.g., distance D2 increases).

Although FIG. 4 illustrates display device 400, in which the distance between display 404 and viewing optics 402 remains constant, in some embodiments, the distance between display 404 and viewing optics 402 is changed (e.g., by moving display 404, viewing optics 402, or both) in addition to, or instead of, changing the focal length of viewing optics 402.

Figure 5A:
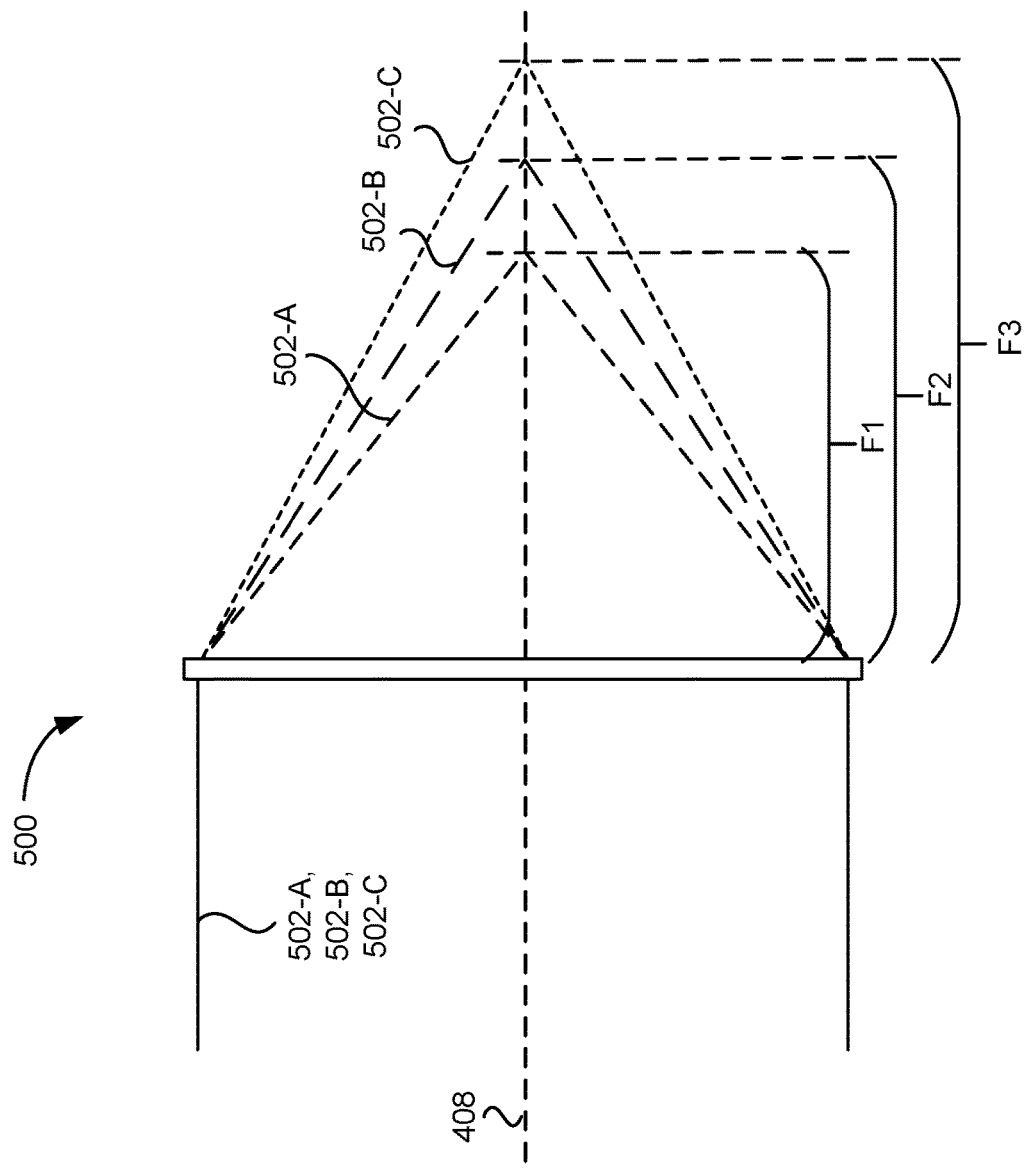
FIG. 5A is a schematic diagram illustrating a diffractive optical element in accordance with some embodiments.

FIG. 5A is a schematic diagram illustrating a wavelength-dependent optical element (e.g., diffractive optical element 500, such as a diffractive lens) in accordance with some embodiments. In some embodiments, diffractive optical element 500 corresponds to viewing optics 402 described with respect to FIG. 4. In some embodiments, diffractive optical element 500 is configured to receive image light from a display (e.g., display 404 in FIG. 4) and redirect the image light toward an eye of a user (e.g., eye 340).

In some embodiments, the wavelength-dependent optical element is a diffractive optical element 500. In some embodiments, the diffractive optical element is made from a transparent optical material (e.g., glass, polymer) with surface relief structures, liquid crystals, or metamaterials. In some embodiments, the diffractive optical element includes metasurfaces. A focal length of a diffractive optical lens is described by Equation 2:

$$f = f_0 \cdot (\lambda_0/\lambda)$$ (Equation 2)

where f is a focal length for wavelength $\lambda$ and $f_0$ is a focal length at a design wavelength $\lambda_0$.

Also from Equation 2, the relationship between the optical power $\varphi$ of the diffractive optical lens and the wavelength $\lambda$ can be described as follows:

$$\varphi = 1/f \propto \lambda$$

In some embodiments, the wavelength-dependent optical element is made of a highly dispersive optical material (e.g., flint glass). Dispersion refers to a change of a refractive index in accordance with wavelength of incident light. Because of dispersion, diffractive optical element 500 has different focal lengths for light with different wavelengths.

Such wavelength-dependent optical elements are capable of directing light within a same color band with different optical powers so that the wavelength-dependent optical elements have distinct focal lengths for different wavelengths within the color band.

As used herein, a color band refers to a contiguous wavelength band corresponding to a particular color (e.g., a range of wavelengths that are perceived as a single color by a viewer). For example, a first color band corresponds to a blue color (e.g., wavelength range from 450 nm to 485 nm), a second color band corresponds to a green color (e.g., wavelength range from 500 nm to 565 nm), and a third color band corresponds to a red color (e.g., wavelength range from 625 nm to 740 nm).

In FIG. 5A, diffractive optical element 500 is shown to receive and redirect light 502-A, 502-B, and 502-C that have distinct wavelengths within a common color band (e.g., a green color band). In some embodiments, light 502-A has a first wavelength within a particular color band (e.g., light 502-A has a first green wavelength), light 502-B has a second wavelength within the particular color band (e.g., light 502-B has a second green wavelength), and light 502-C has a third wavelength within the particular color band (e.g., light 502-C has a third green wavelength). The first, second, and third wavelengths are distinct and separate from one another so that diffractive optical element 500 has first focal length F1 (or a corresponding first optical power) for light 502-A, second focal length F2 (or a corresponding second optical power) for light 502-B, and third focal length F3 (or a corresponding third optical power) for light 502-C, where focal length F2 is greater than focal length F1 and focal length F3 is greater than focal length F2. In some embodiments, a difference between the first wavelength and the second wavelength is at least ten nanometers, at least 20 nanometers, at least 30 nanometers, or at least 40 nanometers. In some embodiments, a difference between the second wavelength and the third wavelength is at least ten nanometers, at least 20 nanometers, at least 30 nanometers, or at least 40 nanometers. In some embodiments, a difference between the first wavelength and the third wavelength is at least ten nanometers, at least 20 nanometers, at least 30 nanometers, or at least 40 nanometers. In some embodiments, a difference between focal lengths F1 and F2 is at least one millimeter. In some embodiments, a difference between focal lengths F2 and F3 is at least one millimeter.

In some embodiments, as explained with respect to FIG. 4, the display (e.g., display 404) is located at a distance to diffractive optical element 500 less than focal lengths F1, F2, and F3.

In some embodiments, light 502-A, 502-B, and 502-C has narrow bandwidths (e.g., full-width half-maximums (FWHM)). Because light 502-A, 502-B, and 502-C has narrow bandwidths, diffractive optical element 500 has distinguishable focal lengths for light 502-A, 502-B, and 502-C. In some embodiments, light 502-A, 502-B, and 502-C has bandwidths less than two nanometers, less than three nanometers, less than four nanometers, or less than five nanometers.

Using diffractive optical element 500 as viewing optics in a varifocal display device (e.g., viewing optics 402 in display device 400 shown in FIG. 4) takes advantage of wavelength-dependent focal lengths of diffractive optical element 500. By shifting a wavelength of image light rendering an object within a common color band, the object appears to be displayed at different distances from the viewer. As explained above with respect to FIG. 4, distance D2 between virtual display plane 406 and viewing optics 402 changes as focal length F of viewing optics 402 changes, in accordance with Equation 1. Therefore, an object rendered with image light having a particular color (e.g., a green-colored object) appears to be displayed at different distances when the wavelength of the image light is shifted within a particular color band corresponding to the particular color. For example, light 502-A has a first green wavelength and the object rendered by light 502-A appears to be at a first distance, light 502-B has a second green wavelength, and the object rendered by light 502-B appears to be at a second distance, and light 502-C has a third green wavelength and the object rendered by light 502-C appears to be at a third distance. Therefore, by shifting the wavelength of the image light within the particular color band, the apparent position of the object (or the apparent distance to the object) is changed. Thus, diffractive optical element 500 in combination with a tunable light source enables varifocal display.

Figure 5B:
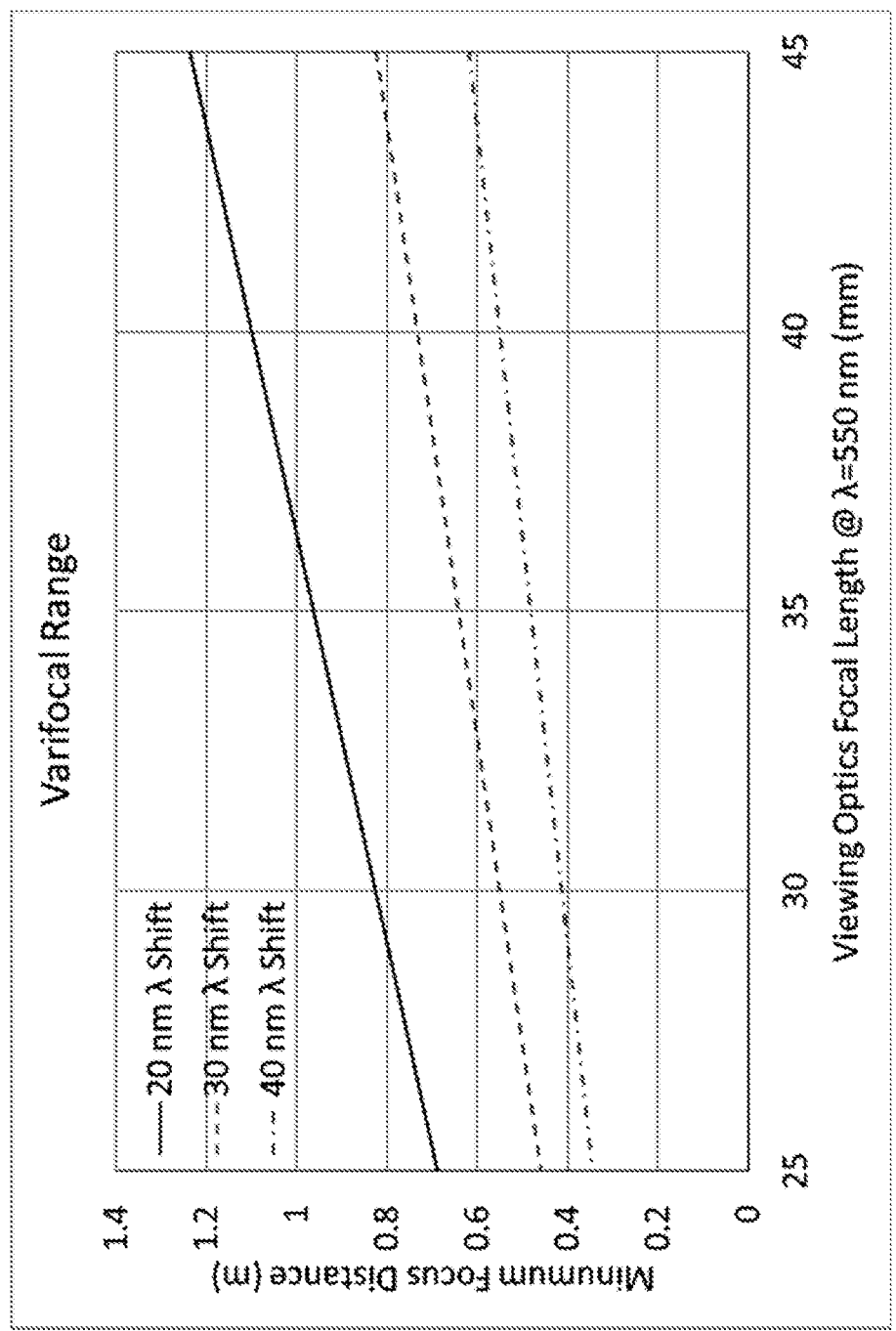
FIG. 5B is a graph illustrating optical properties of the diffractive optical element of FIG. 5A in accordance with some embodiments.

FIG. 5B is a graph illustrating optical properties of diffractive optical element 500 in accordance with some embodiments. The x-axis of FIG. 5B illustrates a range of focal lengths of diffractive optical element 500 at wavelength 550 nm. For lenses having reference focal lengths ranging from 25 mm to 45 mm (for a reference wavelength 550 nm), the focal distances of the lenses changes when the wavelength of the light shifts from 550 nm (e.g., offset by 20 nm, 30 nm, and 40 nm). The y-axis of FIG. 5B illustrates a range of minimum focus distances in meters (e.g., the minimum focus distance corresponding to distance D2 between viewing optics 402 and virtual display plane 406 described with respect to FIG. 4). When display 404 is positioned at a focal length of the viewing optics, virtual display plane 406 is at infinity (e.g., display 404 positioned 30 mm away from viewing optics 402 having 30 mm focal length for light having a wavelength of 550 nm projects virtual image based on light having the wavelength of 550 nm at a virtual image plane at infinity from viewing optics 402). (see, e.g., FIG. 8C). When the wavelength of the light is shifted by 20 nm (e.g., light 502-B in FIG. 5A has wavelength 530 nm), the distance D2 ranges from about 0.7 meters to about 1.25 meters. For example, a lens with a reference focal length of 30 mm for wavelength 550 nm moves the virtual image plane from infinity to 0.85 meters from viewing optics 402 when the wavelength of the light is shifted by 20 nm from 550 nm to 530 nm. When the wavelength of the light is shifted by 30 nm (e.g., light 502-C in FIG. 5A has wavelength 520 nm), the distance D2 ranges from about 0.45 meters to about 0.8 meters. For example, the lens with the reference focal length of 30 mm for wavelength 550 nm moves the virtual image plane from infinity to 0.55 meters from viewing optics 402 when the wavelength of the light is shifted by 30 nm from 550 nm to 520 nm. When the wavelength of the light is shifted by 40 nm, the distance D2 ranges from about 0.35 meters to 0.6 meters. For example, the lens with the reference focal length of 30 mm for wavelength 550 nm moves the virtual image plane from infinity to about 0.4 meters from viewing optics 402 when the wavelength of the light is shifted by 40 nm from 550 nm to 510 nm.

Figure 6A:
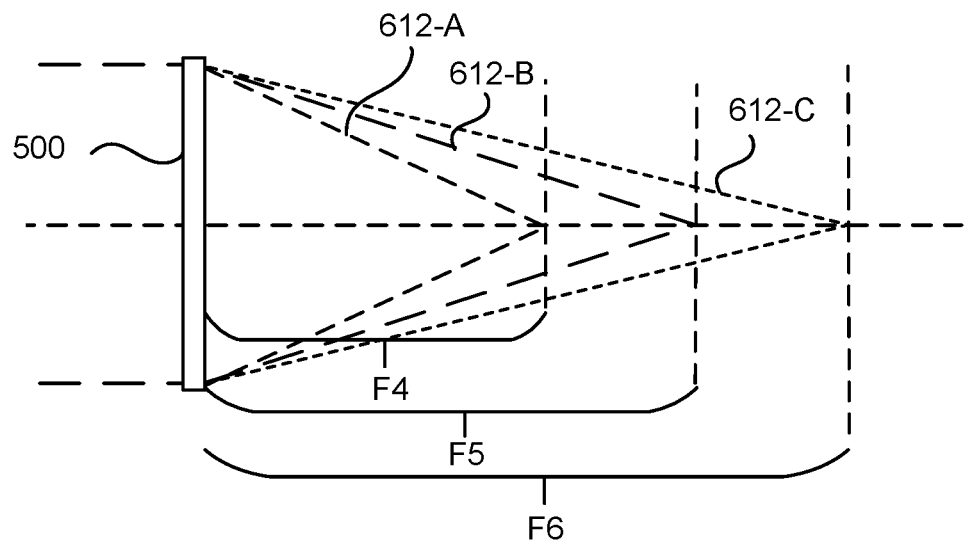
FIG. 6A is a schematic diagram illustrating the diffractive optical element of FIG. 5A redirecting light of different colors in accordance with some embodiments.

FIG. 6A is a schematic diagram illustrating diffractive optical element 500 redirecting light of different colors in accordance with some embodiments. As described above, diffractive optical element 500 has different focal lengths for light with different wavelengths (and hence different focal lengths for light with different colors). As shown in FIG. 6A, diffractive optical element 500 has focal length F4 for light 612-A corresponding to a light having a wavelength in a first color band (e.g., light 612-A corresponding to a red color, such as light having a wavelength of 680 nm), focal length F5 for light 612-B corresponding to a second color band (e.g., light 612-A corresponding to a green color, such as light having a wavelength of 530 nm), and focal length F6 for light 612-C corresponding to a third color band (e.g., light 612-C corresponding to a blue color, such as light having a wavelength of 465 nm). Focal length F5 is greater than focal length F4 and focal length F6 is greater than focal length F5. This can cause cross-band chromatic aberrations corresponding to different color components of an image having apparent positions at different distances.

Figure 6B:
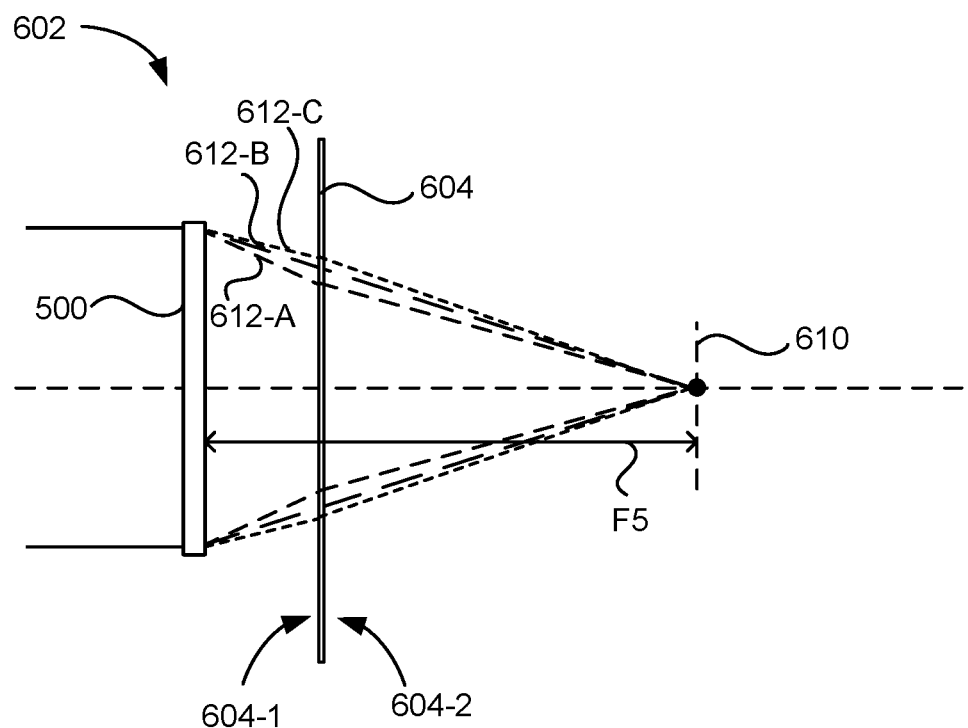
FIG. 6B is a schematic diagram illustrating a varifocal viewing optics in accordance with some embodiments.

The cross-band chromatic aberrations caused by the effect described above can be reduced or eliminated by a corrective wavelength-dependent optical element. The corrective wavelength-dependent optical element is configured to refract light components of different color bands with different optical powers so that a combination of the diffractive optical element 500 and the corrective wavelength-dependent optical element has a common focal length for representative light components within different color bands while providing different focal lengths for light components within each color band. FIG. 6B is a schematic diagram illustrating varifocal viewing optics 602 in accordance with some embodiments. Varifocal viewing optics 602 includes diffractive optical element 500 and wavelength-dependent optical element 604 (e.g., a corrective wavelength-dependent optical element distinct from the wavelength-dependent optical element represented by diffractive optical element 500) optically coupled with diffractive optical element 500. In some embodiments, varifocal viewing optics 602 corresponds to viewing optics 402 described with respect to FIG. 4. In some embodiments, wavelength-dependent optical element 604 and diffractive optical element 500 are positioned in a display device (e.g., display device 400 in FIG.

4) so that that wavelength-dependent optical element 604 is positioned between diffractive optical element 500 and a display (e.g., display 404). In some embodiments, diffractive optical element 500 is positioned between wavelength-dependent optical element 602 and the display. In some embodiments, diffractive optical element 500 and wavelength-dependent optical element 602 are distinct and separate from each other. In some embodiments, diffractive optical element 500 and wavelength-dependent optical element 602 are adjacent to each other. For example, diffractive optical element 500 and wavelength-dependent optical element 602 are in direct contact with each other.

Wavelength-dependent optical element 604 includes one or more wavelength-selective refractive elements configured to redirect light having a particular wavelength range while transmitting light having a wavelength outside the particular wavelength range. In some embodiments, the one or more wavelength-selective refractive elements include one or more holographic optical elements (HOE), one or more Pancharatnam-Berry optical lenses (PBP, also known as geometric phase lenses), or a combination thereof. In some embodiments, wavelength-dependent optical element 604 is a wavelength-multiplexing HOE or a stack of two or more PBPs. For example, a respective wavelength-dependent optical element is configured to redirect light having a red color while transmitting light having other colors without changing their direction. More specifically, wavelength-dependent optical element 604 is configured to redirect one or more color bands of light so that representative light components of different color bands (e.g., light 612-A, 612-B, and 612-C) have a common focal length.

In FIG. 6B, wavelength-dependent optical element 604 includes wavelength-selective refractive elements 604-1 and 604-2. For example, wavelength-selective refractive elements 604-1 and 604-2 are thin film coatings on surfaces of an optical substrate. Wavelength-dependent optical element 604 has wavelength-dependent optical power so that a combination of the optical power of diffractive optical element 500 and the optical power of wavelength-dependent optical element 604 is substantially similar for light 612-A, 612-B, and 612-C. For example, wavelength-selective optical element 604-1 has an optical power for light 612-A (e.g., light 612-A corresponding to red light, or any light within the red color band, such as a wavelength range between 625 nm and 740 nm) but not for light 612-B (e.g., light 612-B corresponding to green light, or any light within the green color band, such as a wavelength range between 500 nm and 565 nm) or 612-C (e.g., light 612-C corresponding to blue light, or any light within the blue color band, such as a wavelength range between 450 nm and 485 nm) and wavelength-selective optical element 604-2 has an optical power for light 612-C (or any light within the blue color band) but not for light 612-A (or any light within the red color band) or 612-B (or any light within the green color band) so that the focal length of a combination of diffractive optical element 604 and wavelength-selective optical element 604 changes from focal length F4 to focal length F5 for light 612-A and from focal length F6 to focal length F5 for light 612-C while the combination of diffractive optical element 604 and wavelength-selective optical element 604 maintains focal length F5 for light 612-B. Alternatively, wavelength-selective optical element 604-1 has an optical power for light 612-A (or any light within the red color band) but not for light 612-B (or any light within the green color band) or 612-C (or any light within the blue color band) and wavelength-selective optical element 604-2 has an optical power for light 612-B (or any light within the green color band) but not for light 612-A (or any light within the red color band) or 612-C (or any light within the blue color band) so that the focal length of a combination of diffractive optical element 604 and wavelength-selective optical element 604 changes from focal length F4 to focal length F6 for light 612-A and from focal length F5 to focal length F6 for light 612-B. Thereby, varifocal viewing optics 602 has a common focal length (e.g., focal length F5) for light 612-A, 612-B, and 612-C corresponding to different color bands. Light 612-A, 612-B, and 612-C therefore has a common virtual display plane 610 from which light 612-A, 612-B, and 612-C appear to originate (see, e.g., virtual display plane 806-A described below with respect to FIG. 8A).

Figure 6C:
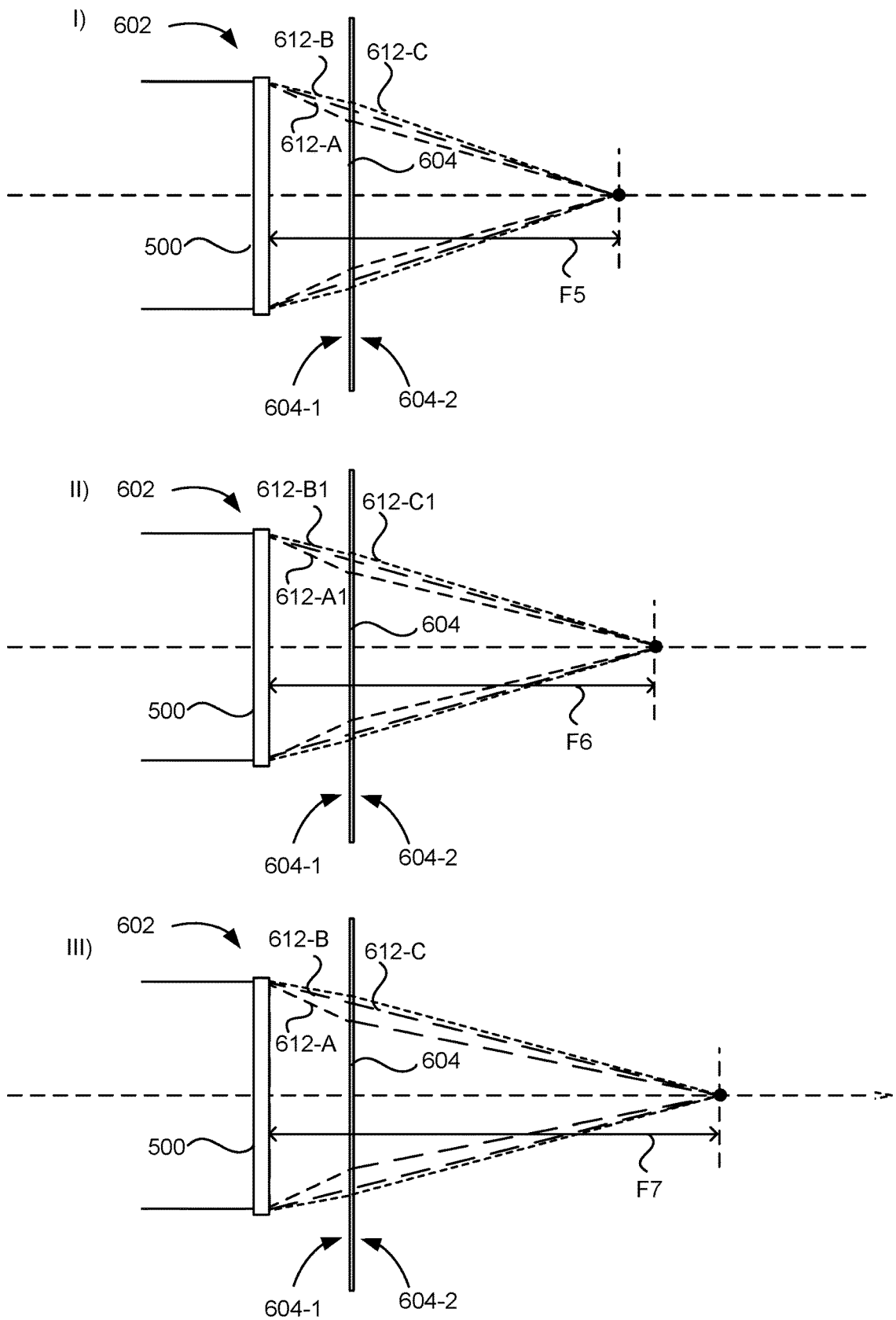
FIG. 6C is a schematic diagram illustrating operations of the varifocal viewing optics of FIG. 6B in accordance with some embodiments.

FIG. 6C is a schematic diagram illustrating operations of varifocal viewing optics 602 in accordance with some embodiments. As shown in FIG. 6C, the combination of wavelength-dependent optical element 604 and diffractive optical element 500 reduces or eliminates chromatic aberrations for light of different color bands during wavelength shifting.

Section I of FIG. 6C corresponds to FIG. 6B where varifocal viewing optics 602 is configured to have a common focal length (e.g., focal length F5) for light 612-A, 612-B, and 612-C. As described above, light 612-A, 612-B, and 612-C correspond to wavelengths within distinct color bands. For example, light 612-A has a first wavelength (e.g., an initial wavelength, such as 625 nm) within the first color band (e.g., red), light 612-B has a first wavelength (e.g., an initial wavelength, such as 500 nm) within the second color band (e.g., green), and light 612-C has a first wavelength (e.g., an initial wavelength, such as 450 nm) within the third color band (e.g., blue). The first, second, and third color bands correspond to different colors (e.g., the first color band is red, the second band is green, and the third color band is blue).

In Section II of FIG. 6C, the wavelengths of the light are shifted (e.g., decreased) and yet the wavelength-shifted light 612-A1, 612-B1, and 612-C1 still correspond to the respective color bands of light 612-A, 612-B, and 612-C. For example, light 612-A1 has a second wavelength (e.g., a subsequent wavelength, such as 680 nm) within the first color band, light 612-B1 has a second wavelength (e.g., a subsequent wavelength, such as 530 nm) within the second color band, and light 612-C1 has a second wavelength (e.g., a subsequent wavelength, such as 465 nm) within the third color band. In some embodiments, all of the light component are shifted by a substantially same wavelength value. For example, wavelengths of light 612-A1, 612-B1, and 612-C1 have all shifted by 20 nanometers, 30 nanometers, or 40 nanometers from respective wavelengths of light 612-A, 612-B, and 612-C. In some embodiments, the light components are shifted by distinct wavelength values. For example, the wavelength of light 612-A1 has shifted from light 612-A by a first wavelength value, the wavelength of light 612-B1 has shifted from light 612-B by a second wavelength value, and the wavelength of light 612-C1 has shifted from light 612-C by a third wavelength value, where at least two of the first, second, and third wavelength values are distinct from each other. In some embodiments, the first, second, and third wavelength values are distinct from one another. As shown, after the wavelength shift, for light 612-A1, 612-B1, and 612-C1, varifocal viewing optics 602 has a common focal length. In Section II, for light 612-A1, 612-B1, and 612-C1, varifocal viewing optics 602 has a common focal length F6 greater than focal length F5 shown in Section I.

In Section III of FIG. 6C, the wavelengths of the light are shifted (e.g., decreased) further and yet the wavelength-shifted light 612-A2, 612-B2, and 612-C2 still correspond to the respective color bands of light 612-A, 612-B, and 612-C. For example, light 612-A2 has a third wavelength (e.g., a final wavelength, such as 740 nm) within the first color band, light 612-B2 has a third wavelength (e.g., a final wavelength, such as 565 nm) within the second color band, and light 612-C2 has a third wavelength (e.g., a final wavelength, such as 485 nm) within the third color band. As described above with respect to Section II, the light components may shift by a same wavelength value or by distinct wavelength values. As shown, after the wavelength shift, for light 612-A2, 612-B2, and 612-C2, varifocal viewing optics 602 has a common focal length. In Section III, for light 612-A2, 612-B2, and 612-C2, varifocal viewing optics 602 has a common focal length F7 greater than focal length F6 in Section II.

Figure 7:
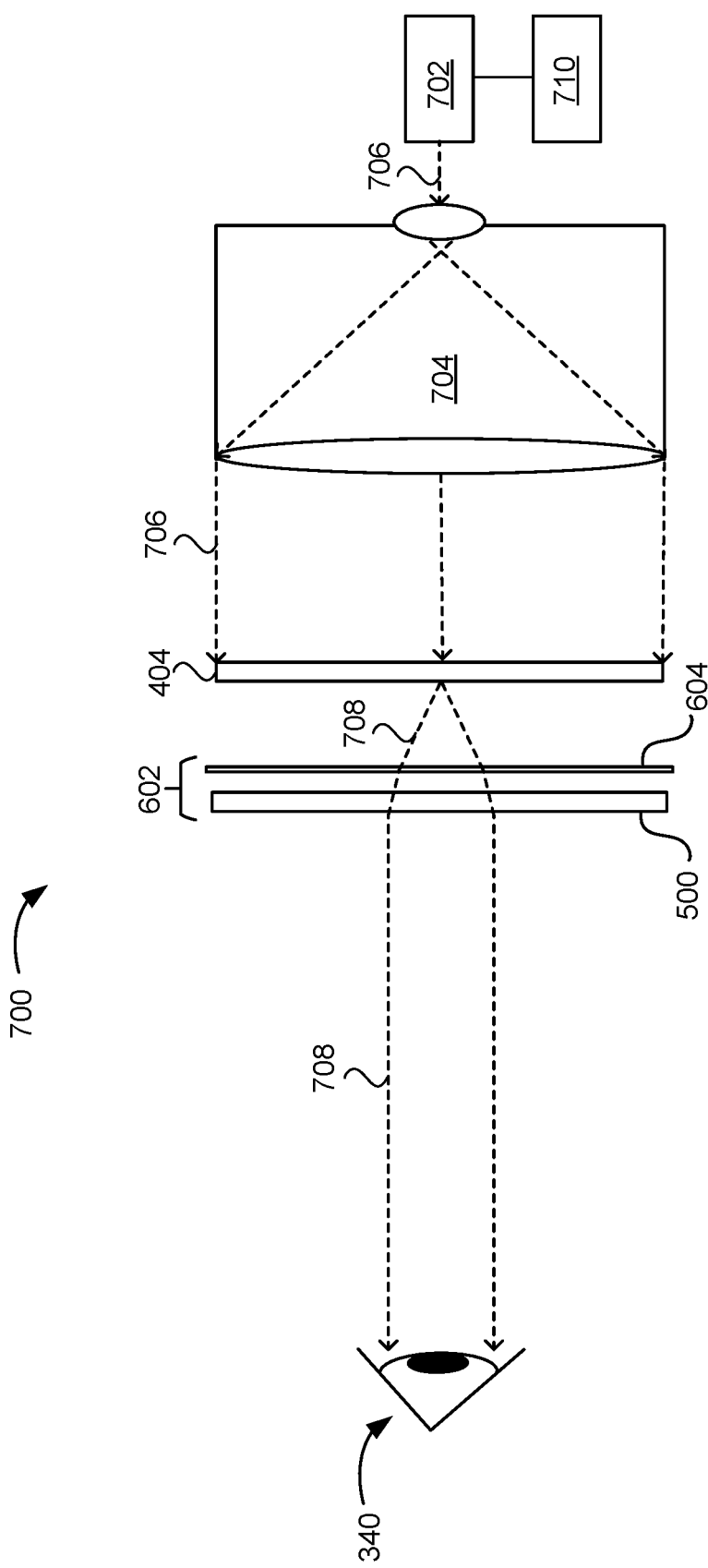
FIG. 7 is a schematic diagram illustrating a varifocal display device in accordance with some embodiments.

FIG. 7 is a schematic diagram illustrating varifocal display device 700 in accordance with some embodiments. Varifocal display device 700 includes viewing optics 602 and display 404 optically coupled with tunable light source 702 and an optional beam expander 704. In some embodiments, varifocal display device 700 is, or included in, a head-mounted display device (e.g., display device 100 described with respect to FIG. 1).

In some embodiments, tunable light source 702 includes one or more tunable lasers. In some embodiments, the one or more tunable lasers include one or more of diode lasers, vertical cavity surface emitting lasers (VCSEL), fiber lasers, and/or solid-state lasers. In some embodiments, a tunable laser includes a tunable gain medium (e.g., a gain medium coupled with a temperature controller, such as a thermoelectric cooler). For example, the tunable laser is an external-cavity diode laser, for which the temperature of the gain medium and the drive current are adjusted to shift a (peak) wavelength of the output light. In some embodiments, a tunable laser includes a tunable intracavity filter. The (peak) wavelength of the output light can be shifted by changing the peak transmission wavelength of the intracavity filter. In some embodiments, a tunable laser includes a tunable resonator. Adjusting the cavity length shifts the (peak) wavelength of the output light.

In some embodiments, tunable light source 702 includes a single laser emitting multiple tunable laser lines. For example, tunable light source 702 includes a single laser that emits a first laser line tunable within a first color band, a second laser line tunable within a second color band, and a third laser line tunable within a third color band, where the first, second, and third color bands correspond to distinct colors (e.g., red, green, and blue colors). In some embodiments, tunable light source 702 includes two or more lasers emitting distinct single tunable laser lines. For example, tunable light source 702 includes a first tunable laser emitting the first tunable laser line within the first color band, a second tunable laser emitting the second tunable laser line within the second color band, and a third tunable laser emitting the third tunable laser line within the third color band. For example, the first color band corresponds to a blue color (e.g., wavelength range from 450 nm to 485 nm), the second color band corresponds to a green color (e.g., wavelength range from 500 nm to 565 nm), and a third color band corresponds to a red color (e.g., wavelength range from 625 nm to 740 nm). Within each of the color bands, the wavelength of the respective tunable laser line should be tunable by at least 40 nanometers. For example, a difference between a lowest wavelength value and a highest wavelength value within a color band is at least 40 nanometers. The one or more tunable lasers are required to emit narrow bandwidth laser lines. In some embodiments, the bandwidths (e.g., FWHM) of the first tunable laser line, the second tunable laser line, and the third tunable laser line are less than two nanometers, less than three nanometers, less than four nanometers, or less than five nanometers. In some embodiments, the one or more tunable lasers of tunable light source 702 have a fast tuning speed in order to project light for displaying moving objects on display 404.

Tunable light source 702 is operable in different states to emit light with different wavelengths (e.g., a first wavelength and a second wavelength that are separate and distinguishable from each other). Tunable light source 702 is operable in two different states, three different states, four different states, or five different states, etc. In some embodiments, tunable light source 702 is continuously tunable and thereby operable in a large number of states (or a continuous spectrum of states). In some embodiments, tunable light source 702 in a first state emits light with the first wavelength of the first color band (e.g., without emitting any other wavelengths within the first color band) and tunable light source 702 in a second state emits light with the second wavelength within the first color band (e.g., without emitting any other wavelengths within the first color band). In some embodiments, tunable light source 702 furthermore includes a third state where the tunable light source 702 emits light with the third wavelength within the first color band (e.g., without emitting any other wavelengths within the first color band). The first state, the second state, and the third state of tunable light source 702 are mutually exclusive in that when tunable light source 702 emits the light with the first wavelength it forgoes emission of light with the second wavelength and the third wavelength, and so on. In some embodiments, tunable light source 702 is operable in the first state, second state, and the third state at different times (e.g., sequentially) and not concurrently.

In some embodiments, tunable light source 702 in a fourth state emits light with the first wavelength of the second color band (e.g., without emitting the first wavelength of the first or third color band and the second wavelength of the second color band) and tunable light source 702 in a fifth state emits light with the second wavelength within the second color band (e.g., without emitting the second wavelength of the first or third color band and the first wavelength of the second color band). Similarly, in some embodiments, tunable light source 702 in a sixth state emits light with the first wavelength of the third color band (e.g., without emitting the first wavelength of the first or second color band and the second wavelength of the third color band) and tunable light source 702 in a seventh state emits light with the second wavelength within the third color band (without emitting the second wavelength of the first or second color band and the first wavelength of the third color band). For example, tunable light source 702 includes three individually operable tunable lasers emitting distinct colors. In some embodiments, the individually operable lasers may be, for example, individually tuned as well as switched on and off individually.

Tunable light source 702 is configured to provide illumination light 706 to display 404. In some embodiments, illumination light 706 is transmitted through one or more beam expanders (e.g., beam expander 704) positioned between tunable light source 702 and display 404. Beam expander 704 is configured to receive illumination light 706-1 and increase its beam size so that illumination light 706 received by display 404 has a size covering at least 70%, 80%, or 90% of an area of display 404. In some embodiments, beam expander 704 is a Keplerian beam expander or a Galilean beam expander. In some embodiments, beam expander 704 expands and collimates illumination light 706. In some embodiments, tunable light source 702 is coupled with a scanning optics (e.g., a scanning mirror) to illuminate display 404 sequentially (e.g., using a Raster scan or any other scanning pattern).

Display 404 is configured to receive illumination light 706 and provide image light 708 to the viewing optics 602. In some embodiments, display 404 includes an emission intensity array (e.g., a spatial light modulator) configured to selectively attenuate illumination light 706 received from tunable light source 702. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, a subset, less than all, of the liquid crystal cells may be set to provide first attenuation (e.g., no attenuation), while another subset, less than all, of the liquid crystal cells may be set to provide second attenuation (e.g., maximum attenuation) distinct from the first attenuation. In this manner, display 404 is able to provide image light 708 to viewing optics 602. Viewing optics 602 is positioned to receive image light 708 and redirect image light 708 toward eye 340 of a user of varifocal display device 700.

In some embodiments, in order to display images of different colors (e.g., red, green, and blue), tunable light source 702 is configured to provide tunable wavelengths within two or more color bands. In some embodiments, when in the first state, tunable light source 702 emits light with the first wavelength of the first color band and light with the first wavelength of the second color band (where the first wavelength of the second color band is distinct from the first wavelength of the first color band) so that the first wavelength of the first color band and the first wavelength of the second band are emitted simultaneously. Similarly, when in the second state, tunable light source 702 emits light with the second wavelength of the first color band and light with the second wavelength of the second color band and, when in the third state, tunable light source 702 emits light with the third wavelength of the first color band and light with the third wavelength of the second color band. In some embodiments, tunable light source 702 emits light components of three of more distinct color bands simultaneously. For example, tunable light source 702 in the first state emits light 612-A, 612-B, and 612-C shown in Section I of FIG. 6C, tunable light source 702 in the second state emits light 612-A1, 612-B1, and 612-C1 shown in Section II of FIG. 6C, and tunable light source 702 in the third state emits light 612-A2, 612-B2, and 612-C2 shown in Section III of FIG. 6C. As explained above, viewing optics 602 has distinct focal lengths for light with the first, second, and third wavelengths within the respective color bands (e.g., focal lengths F5, F6, and F7 in FIG. 6C). A combination of tunable light source 702 and viewing optics 602 therefore enables varifocal display device 700 to project images of different colors to the user that appear to be displayed at distinct distances.

In some embodiments, varifocal display device 700 further includes a set of one or more controllers (e.g., controllers 710) coupled with, or in communication with, tunable light source 702. In some embodiments, the one or more controllers include one or more processors and memory (e.g., processors 216 and memory 228 described above with respect to FIG. 2). The memory stores one or more programs for execution by the one or more processors. In some embodiments, the one or more programs include instructions for operating varifocal display device 700 (e.g., instructions for operating tunable light source 702). In some embodiments, the instructions for operating tunable light source 702) include instructions for switching tunable light source 702 among at least the first state (e.g., varifocal display device 700-1 described below with respect to FIG. 8A), the second state (e.g., varifocal display device 700-2 described below with respect to FIG. 8B), and the third state (e.g., varifocal display device 700-3 described below with respect to FIG. 8C). In some embodiments, the instructions for operating tunable light source 702 also include instructions for adjusting an output power of one or more light components provided by tunable light source 702 so that the light is perceived to have a substantially same intensity for different colors. For example, the controllers adjust an intensity of at least one of light 612-A and 612-A1 in FIG. 6C so that light 612-A and 612-A1 are perceived to have a substantially same intensity.

Figure 8A:
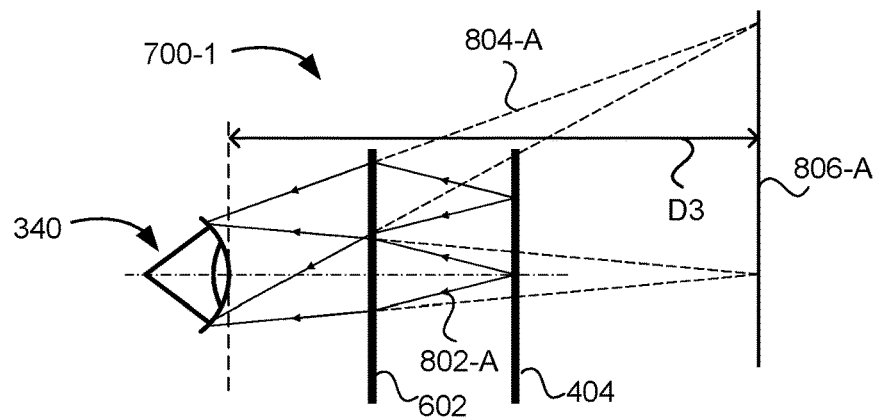
FIGS. 8A-8C are schematic diagrams illustrating operations of the varifocal display device of FIG. 7 in accordance with some embodiments.
Figure 8B:
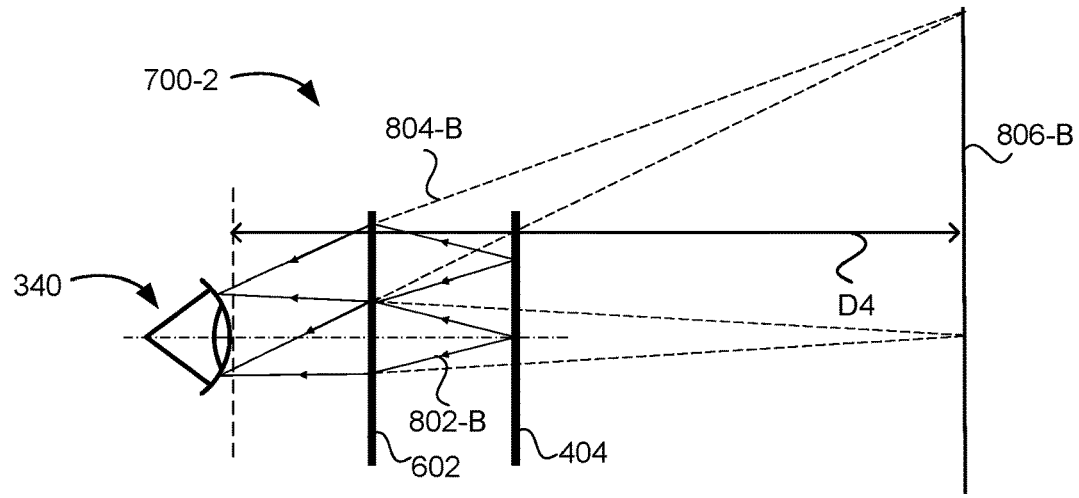
Figure 8C:
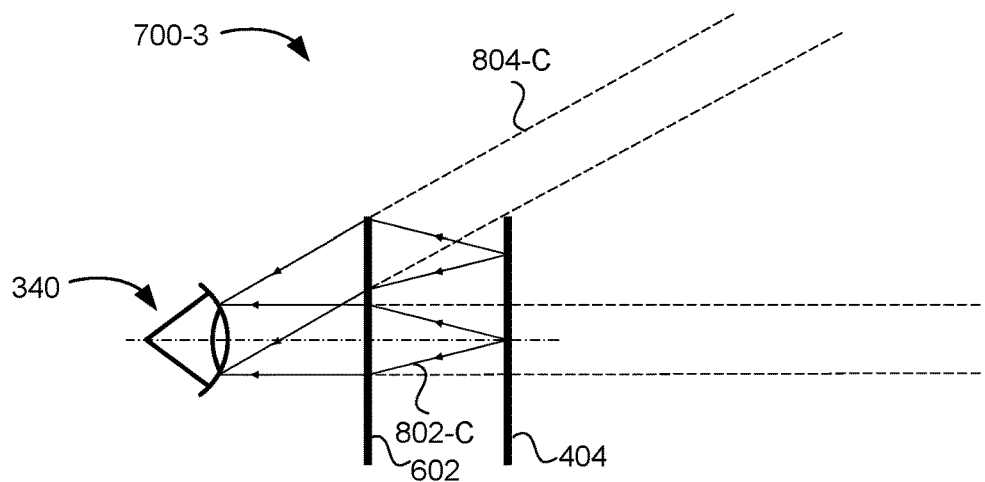

FIGS. 8A-8C are schematic diagrams illustrating operations of varifocal display device 700 in accordance with some embodiments. Tunable light source 702 and beam expander 704 are not shown in FIGS. 8A-8C so as not to obscure other aspects of varifocal display device 700.

FIG. 8A shows varifocal display device 700 in the first state, indicated as varifocal display device 700-1. As described above, in the first state, display 404 receives light with the first wavelength of the first color band, light with the first wavelength of the second color band, and light with the first wavelength of the third color band from tunable light source 702. Image light 802-A (only certain rays of which are shown in FIG. 8A for simplicity) projected by display 404 is received by viewing optics 602 including diffractive optical element 500 and wavelength-dependent optical element 606. Viewing optics 602 has a first focal length for image light 802-A (e.g., focal length F7 shown in Section III of FIG. 6). Viewing optics 602 redirects image light 802-A toward eye 340 so that the image light 802-A has an appearance of originating from virtual display plane 806-A at distance D3 from eye 340 (like rays 804-A). The user of varifocal display device 700-1 therefore observes objects rendered by image light 802-A as if the objects are positioned on virtual display plane 806-A at distance D3.

In FIG. 8B, varifocal display device 700 is in the second state, indicated as varifocal display device 700-2. As described above, in the second state, tunable light source 702 emits light with the second wavelength of the first color band, light with the second wavelength of the second color band, and light with the second wavelength of the third color band. Viewing optics 602 has a second focal length for image light 802-B (e.g., focal length F6, that is less than focal length F7, shown in Section II of FIG. 6). Viewing optics 602 redirects image light 802-B toward eye 340 so that image light 802-B has an appearance of originating from virtual display plane 806-B at distance D4 from eye 340 (e.g., like rays 804-B). The user of varifocal display device 700-2 therefore observes objects rendered by image light 802-B as if the objects are positioned on virtual display plane 806-B at distance D4.

In FIG. 8C, varifocal display device 700 is in the third state, indicated as varifocal display device 700-3. As described above, in the third state, tunable light source 702 emits light with the third wavelength of the first color band, light with the third wavelength of the second color band, and light with the third wavelength of the third color band.

Viewing optics 602 has a third focal length for light 802-C (e.g., focal length F5, that is less than focal length F6, shown in Section I of FIG. 6). Viewing optics 602 redirects image light 802-C toward eye 340 so that image light 802-C has an appearance of originating from virtual display plane located at a far distance (e.g., like rays 804-C). The user of varifocal display device 700-3 observes objects rendered by image light 802-C as if the objects are positioned far away from the user (e.g., at infinity).

In light of these principles, we now turn to certain embodiments.

In accordance with some embodiments, a display device includes a diffractive optical element and a tunable light source operable in different states, including a first state and a second state. For example, varifocal display device 700 includes diffractive optical element 500 and tunable light source 702 in FIG. 7. The tunable light source provides first light having a first wavelength while the tunable light source is in the first state and second light having a second wavelength distinct from the first wavelength while the tunable light source is in the second state. The first wavelength and the second wavelength correspond to a first color band (e.g., a red, green, or blue color band). The diffractive optical element is positioned to receive and redirect the first light. The diffractive optical element has a first focal length for the first light (e.g., diffractive optical element 500 has a focal distance F1 for light 502-A). The diffractive optical element is also positioned to receive and redirect the second light. The diffractive optical element has a second focal length, distinct from the first focal length, for the second light (e.g., diffractive optical element 500 has a focal distance F2, distinct from focal distance F1, for light 502-A). For example, diffractive optical element 500 receives and redirects image light 802-A in FIG. 8A, and receives and redirects image light 802-B in FIG. 8B. Diffractive optical element 500 has different focal lengths for image light 802-A and 802-B.

In some embodiments, the tunable light source forgoes providing the second light having the second wavelength while the tunable light source is in the first state and the tunable light source forgoes providing the first light having the first wavelength while the tunable light source is in the second state. For example, varifocal display device 700-1 in the first state projects image light 802-A without projecting image light 802-B in FIG. 8A. Varifocal display device 700-2 in the second state projects image light 802-A without projecting image light 802-B in FIG. 8B.

In some embodiments, while the tunable light source is in the first state, a user of the display device perceives an image rendered by the first light at a first distance (e.g., eye 340 of a user perceives an image rendered by image light 802-A at virtual display plane 806-A at distance D1 from eye 340 in FIG. 8A). While the tunable light source is in the second state, the user of the display device perceives an image rendered by the second light at a second distance distinct from the first distance (e.g., eye 340 of the user perceives an image rendered by image light 802-B at virtual display plane 806-B at distance D4 from eye 340 in FIG. 8B).

In some embodiments, a difference between the first wavelength and the second wavelength is at least 20 nanometers. A difference between the first focal length and the second focal length is at least one millimeter (e.g., FIG. 5B). In some embodiments, the difference between the first wavelength and the second wavelength is 20 nanometers, 30 nanometers, or 40 nanometers.

In some embodiments, the tunable light source provides light having a first wavelength range including the first wavelength while the tunable light source is in the first state (e.g., image light 802-A in FIG. 8A). The tunable light source provides light having a second wavelength range including the second wavelength while the tunable light source is in the first state (e.g., image light 802-B in FIG. 8B). The first wavelength range has a first bandwidth and the second wavelength range has a second bandwidth. The first bandwidth and the second bandwidth (e.g., FWHM) are less than two nanometers.

In some embodiments, the second wavelength is longer than the first wavelength, and the second focal length is shorter than the first focal length.

In some embodiments, the tunable light source switches from the first state to the second state sequentially so that the first light and the second light are projected sequentially, not concurrently (e.g., varifocal display device 700 is switching between the first state and the second state shown in FIGS. 8A and 8B, respectively, sequentially).

In some embodiments, the tunable light source also provides third light having a third wavelength (e.g., light 612-B in Section I of FIG. 6C) distinct from the first wavelength (e.g., light 612-A in Section I) and the second wavelength (e.g., light 612-A1 in Section II) while the tunable light source is in the first state and fourth light having a fourth wavelength (e.g., light 612-B1 in Section II) distinct from the first wavelength, the second wavelength, and the third wavelength while the tunable light source is in the second state. The third wavelength and the fourth wavelength correspond to a second color band distinct from the first color band. The diffractive optical element is positioned to receive and redirect the third light, and has a third focal length for the third light. The diffractive optical element is positioned to receive and redirect the fourth light, and has a fourth focal length, distinct from the third focal length, for the fourth light.

In some embodiments, the tunable light source in the first state (e.g., varifocal display device 700-1 in FIG. 8A) provides the first light and the third light concurrently at a first time and the tunable light source in the second state (e.g., varifocal display device 700-2 in FIG. 8B) provides the second light and the fourth light concurrently at a second time distinct from the first time.

In some embodiments, the tunable light source forgoes providing any of the second light and the fourth light while the tunable light source provides the first light and the third light. The tunable light source forgoes providing any of the first light and the third light while the tunable light source provides the second light and the fourth light.

In some embodiments, the tunable light source further provides fifth light having a fifth wavelength (e.g., light 612-C in Section I of FIG. 6C) while the tunable light source is in the first state and sixth light having a sixth wavelength (e.g., light 612-C1 in Section II of FIG. 6C) while the tunable light source is in the second state. The fifth wavelength and the sixth wavelength correspond to a third color band distinct from the first color band and the second color band. The diffractive optical element is positioned to receive and redirect the fifth light, and has a fifth focal length for the fifth light. The diffractive optical element is positioned to receive and redirect the sixth light, and has a sixth focal length, distinct from the fifth focal length, for the sixth light.

In some embodiments, the first color band corresponds to red, the second color band corresponds to green, and the third color band corresponds to blue.

In some embodiments, the third focal length is distinct from the first focal length (e.g., FIG. 6A). The display device further includes a wavelength-dependent optical element (e.g., wavelength-dependent optical element 604 in FIG. 6B) positioned to receive and modify at least one of the first light and the third light so that both the first light and the third light has a first virtual display plane. For example, wavelength-dependent optical element 604 modifies light 612-A and 612-C so that a combination of wavelength-dependent optical element 604 and viewing optics 602 has a common optical power (e.g., corresponding to focal length F5) for light 612-A, 612-B, and 612-C in FIG. 6B. Viewing optics 602, in conjunction with the wavelength-dependent optical element, therefore redirects an image light (e.g., image light 802-A in FIG. 8A) so that the image light renders images that are perceived to be on a common virtual display plane at a first common distance (e.g., virtual display plane 806-A at distance D3 in FIG. 8A). In some embodiments, the first common distance is distinct from both the first focal length and the third focal length.

In some embodiments, the wavelength-dependent optical element (e.g., wavelength-dependent optical element 604) includes a Pancharatnam-Berry phase (PBP) lens or a wavelength-multiplexing holographic optical element.

In some embodiments, the fourth focal length is distinct from the second focal length. The wavelength-dependent optical element is positioned to receive and modify at least one of the second light and the fourth light so that both the second light and the fourth light has a second virtual display plane, distinct from the first virtual display plane. For example, wavelength-dependent optical element 604 modifies light 612-A1 and 612-C1 so that viewing optics 602 has a common focal length (e.g., distance F6) for light 612-A1, 612-B1, and 612-C1 in Section II of FIG. 6C. Viewing optics 602 therefore redirects an image light (e.g., image light 802-B in FIG. 8B) so that the image light renders images that are perceived to be on a common virtual display plane at a second common distance (e.g., virtual display plane 806-B at distance D4 in FIG. 8B). In some embodiments, the second common distance is distinct from both the second focal length and the fourth focal length.

In some embodiments, the tunable light source also provides third light having a third wavelength distinct from the first wavelength and the second wavelength while the tunable light source is in a third state (e.g., light 612-B in Section I of FIG. 6C). The third states is distinct from the first state and the second state. In some embodiments, the tunable light source forgoes providing the first light, the second light, and the fourth light while the tunable light source is in the third state. The tunable light source also provides a fourth light having a fourth wavelength distinct from the first wavelength, the second wavelength, and the third wavelength while the tunable light source is in a fourth state (e.g., light 612-B1 in Section II of FIG. 6C). The fourth state is distinct from the first state, the second state, and the third state. In some embodiments, the tunable light source forgoes providing the first light, the second light, and the third light while the tunable light source is in the fourth state. The third wavelength and the fourth wavelength correspond to a second color band distinct from the first color band. The diffractive optical element is positioned to receive and redirect the third light, and has a third focal length for the third light. The diffractive optical element is positioned to receive and redirect the fourth light, and has a fourth focal length for the fourth light. The fourth focal length is distinct from the third focal length. In some embodiments, the tunable light source includes a first tunable light source operable to provide the first light and the second light and a second tunable light source distinct from the first tunable light source operable to provide the third light and the fourth light. For example, tunable light source 702 in FIG. 7 includes two tunable lasers configured to emit light of different color bands.

In some embodiments, the display device further includes a spatial light modulator positioned to receive the first light at a first time and the second light at a second time distinct from the second time (e.g., display 404 in FIGS. 7, 8A and 8B). The spatial light modulator provides modulated light toward the diffractive optical element (e.g., image light 708 in FIG. 7).

In accordance with some embodiments, a method performed at a tunable light source operable in different states including a first state and a second state includes placing the tunable light source in the first state for providing first light having a first wavelength (e.g., FIGS. 7 and 8A). The method includes placing the tunable light source in the second state for providing second light having a second wavelength distinct from the first wavelength (e.g., FIG. 8B). The first wavelength and the second wavelength correspond to a first color band. The method includes receiving and redirecting, with a diffractive optical element, the first light and receiving and redirecting, with the diffractive optical element, the second light. The diffractive optical element has a first focal length for the first light and a second focal length, distinct from the first focal length, for the second light.

In accordance with some embodiments, a set of one or more controllers (e.g., controllers 710 in FIG. 7) configured for use with the display device described herein includes one or more processors and memory storing one or more programs for execution by the one or more processors. The one or more programs include instructions for placing the tunable light source (e.g., tunable light source 702) in the first state for providing the first light having the first wavelength and placing the tunable light source in the second state for providing the second light having the second wavelength distinct. The one or more programs also include instructions for adjusting an output power of the tunable light source so that a perceived intensity of the second light by a user of the display device is substantially the same as a perceived intensity of the first light by the user.

In accordance with some embodiments, a set of one or more controllers (e.g., controllers 710 in FIG. 7) configured for use with the display device described herein includes one or more processors and memory storing one or more programs for execution by the one or more processors. The one or more programs include instructions for placing the tunable light source in the first state for concurrently providing the first light having the first wavelength and the third light having the third wavelength. The one or more programs further include instructions for placing the tunable light source in the second state for concurrently providing the second light having the second wavelength and the fourth light having the fourth wavelength.

Although the display device is described with respect to a diffractive optical element, other wavelength-dependent optical elements may be used in place of the diffractive optical element. Thus, in accordance with some embodiments, a display device includes a tunable light source operable in different states including a first state and a second state. The tunable light source provides first light having a first wavelength while the tunable light source is in the first state, and second light having a second wavelength distinct from the first wavelength while the tunable light source is in the second state. The first wavelength and the second wavelength correspond to a first color band. The display device also includes a wavelength-dependent optical element positioned to receive the first light and redirect the first light, and receive the second light and redirect the second light. The diffractive optical element has a first focal length for the first light, and the diffractive optical element has a second focal length, distinct from the first focal length, for the second light.

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A display device, comprising:
   a tunable light source operable in different states including a first state and a second state, wherein:
      the tunable light source provides:
         first light having a first wavelength while the tunable light source is in the first state;
         second light having a second wavelength distinct from the first wavelength while the tunable light source is in the second state;
         third light having a third wavelength distinct from the first wavelength and the second wavelength while the tunable light source is in the first state; and
         fourth light having a fourth wavelength distinct from the first wavelength, the second wavelength, and the third wavelength while the tunable light source is in the second state;
      the first wavelength and the second wavelength correspond to a first color band; and
      the third wavelength and the fourth wavelength correspond to a second color band distinct from the first color band; and
   a diffractive optical element positioned to:
      receive the first light and redirect the first light, wherein the diffractive optical element has a first focal length for the first light;
      receive the second light and redirect the second light, wherein the diffractive optical element has a second focal length, distinct from the first focal length, for the second light;
      receive the third light and redirect the third light, wherein the diffractive optical element has a third focal length for the third light; and
      receive the fourth light and redirect the fourth light, wherein the diffractive optical element has a fourth focal length, distinct from the third focal length, for the fourth light, wherein:
         the third focal length is distinct from the first focal length; and
         the display device further includes a wavelength-dependent optical element positioned to receive and modify at least one of the first light and the third light so that both the first light and the third light have a common virtual display plane.

2. The display device of claim 1, wherein:
the tunable light source forgoes providing the second light having the second wavelength while the tunable light source is in the first state; and
the tunable light source forgoes providing the first light having the first wavelength while the tunable light source is in the second state.

3. The display device of claim 1, wherein:
while the tunable light source is in the first state, a user of the display device perceives an image rendered by the first light at a first distance; and
while the tunable light source is in the second state, the user of the display device perceives an image rendered by the second light at a second distance distinct from the first distance.

4. The display device of claim 1, wherein:
a difference between the first wavelength and the second wavelength is at least 20 nanometers; and
a difference between the first focal length and the second focal length is at least one millimeter.

5. The display device of claim 1, wherein:
the tunable light source provides light having a first wavelength range including the first wavelength while the tunable light source is in the first state;
the tunable light source provides light having a second wavelength range including the second wavelength while the tunable light source is in the second state; and
the first wavelength range has a first bandwidth and the second wavelength range has a second bandwidth, the first bandwidth and the second bandwidth being less than two nanometers.

6. The display device of claim 1, wherein:
the second wavelength is longer than the first wavelength, and the second focal length is shorter than the first focal length.

7. The display device of claim 1, wherein:
the tunable light source switches from the first state to the second state sequentially.

8. The display device of claim 1, wherein:
the tunable light source in the first state provides the first light and the third light concurrently at a first time and the tunable light source in the second state provides the second light and the fourth light concurrently at a second time distinct from the first time.

9. The display device of claim 8, wherein:
the tunable light source forgoes providing any of the second light and the fourth light while the tunable light source provides the first light and the third light; and
the tunable light source forgoes providing any of the first light and the third light while the tunable light source provides the second light and the fourth light.

10. The display device of claim 1, wherein:
the tunable light source further provides:
   fifth light having a fifth wavelength while the tunable light source is in the first state; and sixth light having a sixth wavelength while the tunable light source is in the second state;

the fifth wavelength and the sixth wavelength correspond to a third color band distinct from the first color band and the second color band; and the diffractive optical element is positioned to:
 receive the fifth light and redirect the fifth light, wherein the diffractive optical element has a fifth focal length for the fifth light; and
 receive the sixth light and redirect the sixth light, wherein the diffractive optical element has a sixth focal length, distinct from the fifth focal length, for the sixth light.

11. The display device of claim 10, wherein:
the first color band corresponds to red, the second color band corresponds to green, and the third color band corresponds to blue.

12. The display device of claim 1, wherein:
the wavelength-dependent optical element includes a Pancharatnam-Berry phase (PBP) lens or a wavelength-multiplexing holographic optical element.

13. The display device of claim 1, wherein:
the fourth focal length is distinct from the second focal length; and
the wavelength-dependent optical element is positioned to:
 receive and modify at least one of the second light and the fourth light so that
 both the second light and the fourth light have a second virtual display plane, distinct from the common virtual display plane.

14. The display device of claim 1, wherein:
the tunable light source also provides:
 third light having a third wavelength distinct from the first wavelength and the second wavelength while the tunable light source is in a third state distinct from the first state and the second state; and
 fourth light having a fourth wavelength distinct from the first wavelength, the second wavelength, and the third wavelength while the tunable light source is in a fourth state distinct from the first state, the second state, and the third state;
the third wavelength and the fourth wavelength correspond to a second color band distinct from the first color band; and
the diffractive optical element is positioned to:
 receive the third light and redirect the third light, wherein the diffractive optical element has a third focal length for the third light; and
 receive the fourth light and redirect the fourth light, wherein the diffractive optical element has a fourth focal length, distinct from the third focal length, for the fourth light.

15. The display device of claim 1, further comprising:
a spatial light modulator positioned to:
 receive the first light at a first time and the second light at a second time distinct from the first time; and
 provide modulated light toward the diffractive optical element.

16. A set of one or more controllers configured for use with the display device of claim 1, the set of one or more controllers comprising:
one or more processors; and
memory storing one or more programs for execution by the one or more processors, the one or more programs including instructions for:
 placing the tunable light source in the first state for providing the first light having the first wavelength;
 placing the tunable light source in the second state for providing the second light having the second wavelength distinct from the first wavelength; and
 adjusting an output power of the tunable light source so that a perceived intensity of the second light by a user of the display device is substantially the same as a perceived intensity of the first light by the user.

17. A set of one or more controllers configured for use with the display device of claim 1, the set of one or more controllers comprising:
one or more processors; and
memory storing one or more programs for execution by the one or more processors, the one or more programs including instructions for:
 placing the tunable light source in the first state for concurrently providing the first light having the first wavelength and the third light having the third wavelength; and
 placing the tunable light source in the second state for concurrently providing the second light having the second wavelength and the fourth light having the fourth wavelength.

18. A method, comprising:
at a tunable light source operable in different states including a first state and a second state:
 placing the tunable light source in the first state for providing (i) first light having a first wavelength and (ii) third light having a third wavelength distinct from the first wavelength;
 placing the tunable light source in the second state for providing (iii) second light having a second wavelength distinct from the first wavelength and the third wavelength and (iv) fourth light having a fourth wavelength distinct from the first wavelength, the second wavelength, and the third wavelength, wherein the first wavelength and the second wavelength correspond to a first color band and the third wavelength and the fourth wavelength correspond to a second color band distinct from the first color band;
 receiving, with a diffractive optical element, the first light and redirecting the first light;
 receiving, with the diffractive optical element, the second light and redirecting the second light;
 receiving, with the diffractive optical element, the third light and redirecting the third light;
 receiving, with the diffractive optical element, the fourth light and redirecting the fourth light, wherein the diffractive optical element has (a) a first focal length for the first light (b) a second focal length, distinct from the first focal length, for the second light, (c) a third focal length for the third light, and (d) a fourth focal length, distinct from the third focal length, for the fourth light; and
 receiving and modifying, with a wavelength-dependent optical element, at least one of the first light and the third light so that both the first light and the third light have a common virtual display plane.

* * * * *